United States Patent
Engl et al.

(10) Patent No.: US 7,882,276 B2
(45) Date of Patent: Feb. 1, 2011

(54) INPUT/OUTPUT MODULE FOR A PROGRAMMABLE CONTROLLER

(75) Inventors: Werner Engl, Luhe-Wildenau (DE); Stefan Grosser, Schnaittenbach (DE); Gerald Hirmer, Mantel (DE); Mario Maier, Ensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 823 days.

(21) Appl. No.: 11/527,216

(22) Filed: Sep. 26, 2006

(65) Prior Publication Data
US 2007/0069590 A1 Mar. 29, 2007

(30) Foreign Application Priority Data
Sep. 28, 2005 (EP) .................. 05021187

(51) Int. Cl.
G08B 21/00 (2006.01)
G06F 3/00 (2006.01)

(52) U.S. Cl. .............. 710/19; 710/15; 710/18; 340/540

(58) Field of Classification Search .......... 340/540; 710/15, 18, 19
See application file for complete search history.

(56) References Cited

U.S. PATENT DOCUMENTS

| 5,731,595 A | * | 3/1998 | Clark | 250/551 |
| 5,777,557 A | | 7/1998 | Fayfield | |
| 6,016,017 A | * | 1/2000 | Kadanka et al. | 307/64 |
| 6,411,532 B1 | | 6/2002 | Piron | |
| 6,583,610 B2 | * | 6/2003 | Groom et al. | 323/288 |
| 6,605,957 B1 | | 8/2003 | Piron et al. | |
| 7,253,592 B2 | * | 8/2007 | Leyk et al. | 323/222 |
| 7,475,495 B2 | * | 1/2009 | Chiles et al. | 34/443 |

* cited by examiner

Primary Examiner—Chun-Kuan Lee
Assistant Examiner—Zachary K Huson

(57) ABSTRACT

An input/output module for a programmable controller is provided that generates an output voltage and an output current from the power input. The input/output module functions as a power supply which re-emits or outputs at least some of the power input so that the occurrence of dissipation heat internally within the module is prevented or reduced. The input/output module reduces the power loss that arises inside the input/output module whenever a digital input receives current. A method is also provided for operating an input/output module for a programmable controller.

12 Claims, 3 Drawing Sheets

INPUT/OUTPUT MODULE FOR A PROGRAMMABLE CONTROLLER

CROSS REFERENCE TO RELATED APPLICATIONS

This application claims priority of European application No. 05021187.9 filed Sep. 28, 2005, which is incorporated by reference herein in its entirety.

FIELD OF INVENTION

The invention relates to an input/output module for a programmable controller comprising at least one power supply contact, at least one signaling contact functioning as a digital input and at least one grounding contact for connecting a sensor which is external to the module at least to the signaling contact. An input/output module is deemed here to refer to any module in or for a programmable controller which is defined and provided for connecting external peripherals, that is e.g. actuators and/or sensors.

BACKGROUND OF THE INVENTION

The term input/output module is used hereinbelow to refer either to the individual module having respectively a connection facility for external peripherals such as e.g. switches, limit monitors, electrical, hydraulic or pneumatic units and such like, or, particularly in the case of so-called compact programmable controllers, i.e. devices in which the control and processing functionality and the facilities for connecting peripherals are combined in one device, to the entire programmable controller.

Programmable controllers of the type cited in the introduction, particularly in an embodiment as modular programmable controllers, are generally known e.g. in the form of programmable controllers which are supplied by the applicant under the SIMATIC brand. From these programmable controllers, input/output modules fashioned as individual modules, in particular input modules or combined input/output modules, as a concrete example of an input/output module, are also known.

The invention relates specifically to an input/output module comprising at least one signaling contact functioning as a digital input. Such an input/output module constitutes accordingly an input/output module with digital input functionality. Such modules are frequently fashioned with a plurality, e.g. 16 or 32, of digital inputs and are designated digital input modules accordingly. The digital input module is thus a special form of input/output module with exclusively digital input functionality. Besides these, mixed forms, that is e.g. digital input/output modules or digital input and analog input modules, can also have at least one signaling contact functioning as a digital input. The peripheral devices covered by the invention are correspondingly also collectively referred to in short below by the term digital input module or input module or module, the key criterion being invariably the at least one signaling contact functioning as a digital input.

The input modules known in the prior art are based on the principle that a current flows into the module via a digital input, that is, the input channel linked to the signaling contact, when a connected sensor is activated. In the simplest case, the sensor is recognized as activated when a current is flowing. Correspondingly, the sensor is recognized as deactivated when there is no current flowing. However, even where a sensor is deactivated, a current can flow into the module so the status of the sensor is normally recognized from the magnitude of a voltage, preferably from the exceeding of certain predefined or predefinable threshold values for the voltage magnitude which is required for driving a current via the signaling contact.

This standard principle is not quite optimal insofar as a power loss arises inside the module as a result of the input current. In standards specified under IEC 61131-2 for voltage and current values at digital inputs (type 1: high signal in the voltage range 15V ... 30V, input current at high signal: min. 2 mA; type 2: high signal in the voltage range 11V ... 30V, input current at high signal: min. 6 mA), the power loss in an input channel of the above-mentioned second type, which is also suitable for connecting so-called BEROs (contactlessly operating sensors), amounts to at least 30V×6 mA=180 mW. The power loss also varies depending on the electrical connection of the input channel. In the case of an input channel realized by means of a passive circuit, a power loss of 30V× 16.4 mA=492 mW occurs. The preceding numerical example (power loss: 180 mW) relates to an "active circuit" with a so-called current sink.

The power loss shown above by way of example arises, moreover, in each input channel, i.e. in the case of a module comprising 32 input channels, the power loss amounts to a total of 32×180 mW=5.76 W (32×492 mW=15.74 W). As regards a desirable reduction in the power loss, however, it is not possible to reduce the magnitude of the input currents, since it is not otherwise possible to comply with the requirements under IEC 61131-2.

Furthermore, it must be taken into account that efforts are being made to develop 64-channel modules. By extrapolation, power losses of 64×180 mW=11.5 W and 64×492 mW=31.5 W will arise respectively for the implementation of all inputs with an active and passive circuit.

The power loss must be dissipated from the module and, as a result, necessitates a certain size for the module. Since the sizes theoretically required run contrary to the trend toward miniaturization, a derating of modules is frequently carried out, i.e. the user has to take care to ensure that only a certain predetermined number of input channels is activated simultaneously (permanently). In unfavorable cases, this may mean that e.g. only half of the inputs available can actually be used.

SUMMARY OF THE INVENTION

The object of the invention is accordingly to reduce the power loss occurring at the module end so as thereby to be able to realize e.g. modules of a reduced size or modules of a size which remains at least essentially the same, in which, however, all, or at least a greater number of, the input channels can be used simultaneously.

The invention proposes, in order to avoid or at least reduce the above-mentioned disadvantages and in order to achieve the above-mentioned object or to achieve individual aspects of the above-mentioned object, an input module with a power-loss optimized digital input or such a power-loss optimized digital input. In an input/output module of the type specified in the introduction, means are provided to this end for outputting (outputting means) electrical energy which can be input via at least the signaling contact.

The electrical energy which can be input via the signaling contact is in this case the electrical energy which, when the module is in operating mode, is the cause of the power loss incurred internally within the module due to the input current via the digital input (as described above).

The invention proceeds here from the recognition that, whenever a digital input receives current, i.e. current is input into the module via the signaling contact due to a voltage being applied externally (over the sensor), a power loss occurs within the module. Instead of this power being converted into heat, as was previously the norm, it is brought to a useable voltage level by means of the outputting means and output again by the module, i.e. re-emitted as output voltage and output current. The module thus outputs electrical energy in the form of current and/or voltage. It generates in practice an output power from the power input via the signaling contact(s) and prevents or at least reduces by this means the occurrence of power loss in the area of the module.

For connecting the sensor, the power supply contact is preferably provided in addition to the signaling contact. In this case, the outputting of the electrical energy also takes place via this power supply contact. Some of the electrical energy received as input current by the module is thus returned directly for supplying the respective sensor with electricity.

If the outputting means is/are fashioned as switching regulators, it can be ensured that the electrical energy, i.e. the current and the voltage which the module outputs again, in particular via the power supply contact, is generated with a high degree of efficiency and low power loss. With such a switching regulator, it is possible, given suitable configuration and parameterization, for the output voltage which is output to be so large that it can drive a current out to a module supply (e.g. P24) which is also externally connected to the power supply contact. The emitted output current depends here on the power which is fed into the module at the respective digital input.

In order to achieve such a high degree of efficiency, the outputting means is/are fashioned preferably in the faun of a clocked step-up converter with a constant-current sink or the switching regulator comprises at least one such clocked step-up converter with a constant current sink.

The losses can be reduced by the concept according to the invention to about 30% of the losses incurred in existing solution concepts. This means that three times the number of digital inputs can be realized in a design of the same size. As a result, high-channel modules can be realized without derating.

The outputting means, i.e. in particular the switching regulator or the clocked step-up converter with a constant-current sink, is or are preferably realized through integration in a so-called ASIC. The use of an ASIC has the advantage that the functionality for short-circuit and open-circuit monitoring in respect of the respective digital input can additionally be integrated in the ASIC.

In order to evaluate the respective status of the connectable or connected sensor, it is provided that the outputting means comprise(s) processing functionality such that, from a voltage which is required in operating mode for driving a current via the signaling contact, in particular from the exceeding of predetermined or predeterminable threshold values for the resulting voltage, the status of the sensor connected to the signaling contact can be recognized. The recognition of high level and low level (correspondingly activated or non-activated input channel/sensor) is advantageously made here, as in existing input modules, from the level of the voltage at a constant current via the signaling contact. It is in this way advantageously also achieved that for users of devices fashioned according to the invention the connection of process peripherals is effected unchanged, the respective sensor being connected, in particular in an unchanged manner, from P24, i.e. the power supply contact, to the signaling contact.

It is preferably also provided that, depending on the status of the sensor which can be recognized by means of the processing functionality of the outputting means, an evaluation branch is triggered which is provided for transferring the recognized status of the sensor to a processing unit. Here, the use of an evaluation branch complements a solution in which the processing functionality comprises storage means from which the recognized status of the connected sensor can be read directly. With the evaluation branch, the status transfer also takes place on the level of "primary electrical variables", i.e. through current flow, and not just on the level of digital data for coding the logic status of the digital input.

For metallic isolation, the evaluation branch preferably comprises an optocoupler. Furthermore, according to an advantageous embodiment it can be provided that the evaluation branch comprises a display element, e.g. an LED, with which the recognized status of the sensor, i.e. the internal logic status of the digital input, is displayed.

According to a further preferred embodiment, it is provided that the input/output module comprises as a power supply contact a first and a second power supply contact, the first power supply contact being provided for supplying the input/output module with electrical energy, the second power supply contact being provided for outputting electrical energy through the outputting means and for connecting the sensor, and it being possible for electrical energy which can be input via the signaling contact to be output via the second power supply contact. At the second power supply contact, a detector supply can then be picked up; the terms detector and sensor (detector supply and sensor supply by analogy also) are to be understood as synonyms. The detector supply is thus provided for the electrical supply to the respectively connected sensor.

Here, the detector supply is preferably fed from two sources, the outputting means for removing the electrical energy which can be output via the second power supply contact (detector supply) being provided on the one hand by a current which can be input via the signaling contact and on the other by an electric current which can be input via the first power supply contact. The feeding of the detector supply is preferably effected here primarily from the power which is input into the module via the respective digital input. Secondarily, the feeding of the detector supply is effected from the module supply, e.g. P24, being applied to the first power supply contact.

As well as relating to the device essentially described previously, i.e. the input/output module or a digital input of such an input/output module, the invention relates in the same manner also to a method for operating such an input/output module. According to this method, it is provided that the outputting means receive/s a current via the signaling contact, that the evaluation of the status of a sensor connected to the signaling contact, i.e. the input contact of the respective digital input, is effected from a voltage which is required in operating mode for driving a current via the signaling contact, in particular from the exceeding of predetermined or predeterminable threshold values for the voltage level arising, and that at least some of the current received by the outputting means is output again via the power supply contact.

The inventive method also achieves the object stated in the introduction and realizes the advantages striven for in accordance with the object.

It is preferably also provided that, in order to transfer the recognized status of the connected sensor to a processing unit, an evaluation branch which comprises in particular an optocoupler, in particular an optocoupler and a display element, is activated or deactivated depending on the status. As regards the advantages of this preferred embodiment of the method, the reader is referred to the advantages explained further above in conjunction with the corresponding device.

An exemplary embodiment of the invention will be explained in detail below with the aid of the drawings. Items or elements corresponding to one another are labeled with the same reference characters in all the figures.

DETAILED DESCRIPTION OF THE DRAWINGS

Figure 1:
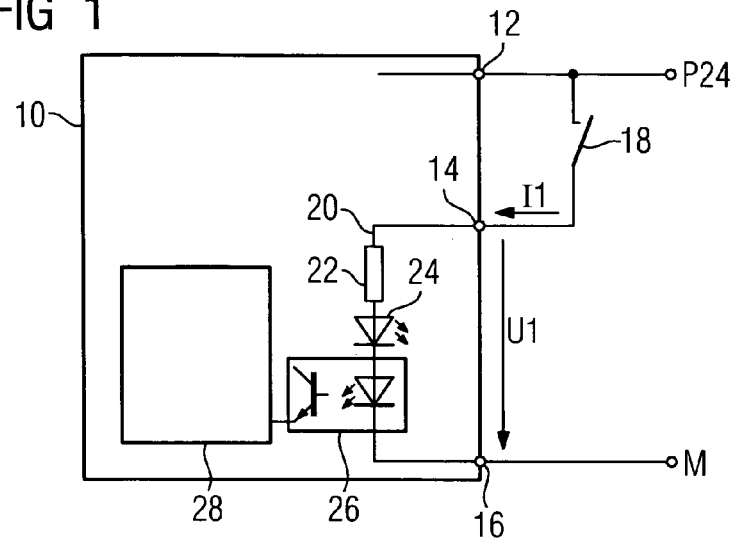
FIG. 1 shows a schematic diagram of a circuit of an input/output module comprising a digital input according to the prior art.

FIG. 1 shows, taking a digital module as an example, an input/output module 10 comprising a power supply contact 12, a signaling contact 14 and a grounding contact 16. A switch is shown as a sensor 18. This switch applies in a closed position the supply potential P24 which is applied at the power supply contact 12, that is e.g. $U_{P24}$, to the digital input, i.e. the signaling contact 14. An input current I1 flows into the module 10 via the signaling contact 14 when a voltage U1 is applied over the signaling and the grounding contact 14, 16.

Internally within the module, the digital input comprises an evaluation branch 20 which, in the example shown, comprises a resistor 22, a display element 24, e.g. an LED, and an optocoupler 26. The optocoupler 26 is provided as a transfer element for transferring the respective status of the connected sensor 18 to a processing unit 28. By means of the optocoupler 26, a metallic isolation is achieved inside the input/output module between a first part of the circuit, which part can be influenced externally via the supply, the signaling and the grounding contact, and a second part of the circuit, independent thereof, for data processing and/or transmission. Here, the second part of the circuit is provided in particular for evaluating the respectively recognized states of the individual channels and/or for handling the transmission of data, which through combination of the states that can be recorded in a module accrue to form corresponding data words, via a bus in accordance with the respective bus protocol.

Inside the module 10, the power loss P1=I1×U1=6 mA×30V=180 mW occurs at the digital input. This power loss occurs for each channel, i.e. in a module 10 with 32 input channels (32-channel module) a total power loss of 32×0.18 W=5.76 W is produced.

Figure 2:
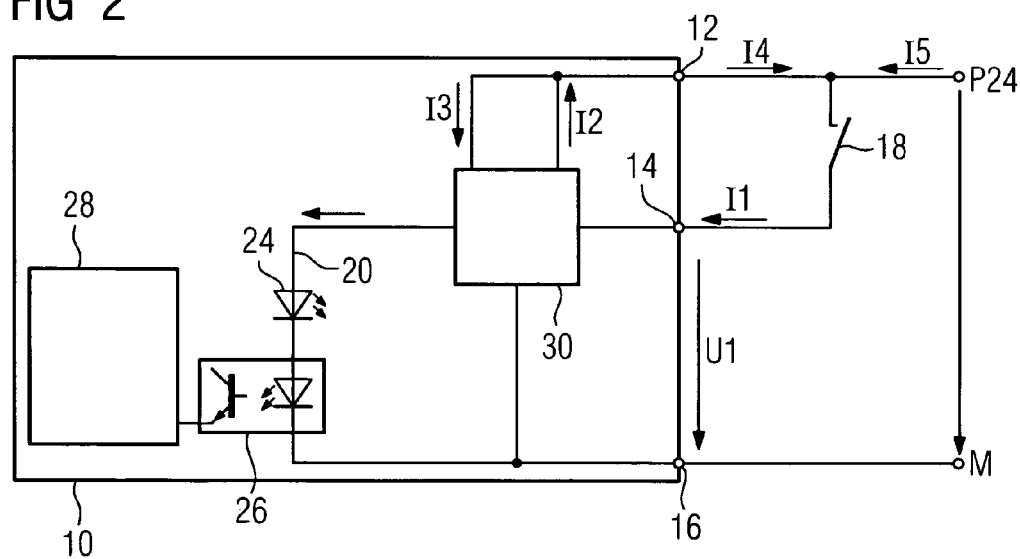
FIG. 2 shows a schematic diagram of a circuit of an input/output module comprising a digital input according to the invention.

FIG. 2 shows an input/output module 10 according to the invention. Analogously to the preceding diagram in FIG. 1, a switch is connected as a sensor 18 to the at least one digital input of the module 10, that is, at least to the signaling contact 14. This switch applies in the closed position the potential which is applied at the power supply contact 12 to the signaling contact 14. The input current I1 flows into the module 10 when a voltage U1 is applied over the signaling and the grounding contact 14, 16.

The module 10 receives at the digital input, i.e. via the signaling contact 14, a current of e.g. 6 mA as an input current I1. The input current I1 is an example of electrical energy fed into the module 10. Accordingly, the input current I1 is also referred to in general below as input electrical energy.

Associated with this input current I1 is a power loss which fundamentally accrues inside the module and which according to the invention is prevented or at least reduced by means 30 being provided for outputting (outputting means) the electrical energy which is or can be input at least via the signaling contact 14.

A switching regulator 30, in particular in an embodiment as a clocked step-up converter with constant-current sink, is provided as an outputting means 30. The switching regulator 30 regulates the input current I1 such that it is held constant at 6 mA. When a voltage U1 of e.g. 30 V is applied over the signaling and grounding contact 14, 16, the module 10 receives at the digital input, i.e. via the signaling contact 14, the power $P_{auf1}$=I1×U1=6 mA×30V=180 mW. This power is received for each channel. In a 32-channel module, the result is a total power loss of $P_{auf32}$=32×0.18 W=5.76 W.

The switching regulator 30 outputs at least some of this received power or some of this input electrical energy to the supply potential which is applied at the power supply contact 12, e.g. P24. The output electrical energy is shown in FIG. 2 as current I2 output by the switching regulator 30. The power emitted is calculated to be $P_{ab}$=$U_{P24}$×I2. The emitted power $P_{ab}$ is generated inside the module 10 by the switching regulator 30, in particular the clocked step-up converter, from the received power $P_{auf32}$. If this generation is effected with an efficiency of e.g. 70%, only 0.3×5.76 W=1.7 W still accrues in the module 10 as a power loss.

The intrinsic consumption of the switching regulator 30 is covered by a current from the supply voltage, e.g. P24, which applies at the power supply contact 12, and is labeled I3 in the diagram. In operating mode, only a current which is needed to cover the losses and which is shown in the drawing by 15 is taken from the power supply P24 delivering the supply voltage.

A sample calculation illustrates the resulting conditions:
Input current if there is one channel:
I1=6 mA per channel.
Input current if there are 32 channels:
I1=32×6 mA=192 mA.
Power which is received at 32 inputs where a voltage designated U1 of 30V is applied over the signaling contact 14 and the grounding contact 16:
$P_{auf}$=I1×U2=192 mA×30V=5.76 W.
Assumed efficiency of the outputting means 30, i.e. e.g. of the switching regulator 30: 70%.
Power loss inside the module:
$P_v$=0.3×$P_{auf}$=0.3×5.76 W=1.73 W.
Power which can be output in the form of electrical energy via the power supply contact 12 in the way of a current generated by the outputting means 30:
$P_{ab}$=0.7×$P_{auf}$=0.7×5.76 W=4.03 W.
When a supply voltage from the power supply, e.g. P24, of e.g. $U_{P24}$=30V is applied at the power supply contact 12, the output current I4 is calculated to be I4=$P_{ab}$/$U_{P24}$=4.03 W/30V=134 mA.
From the power supply P24, i.e. e.g. a corresponding power supply unit, a current I5 of I1-I4 is received:
I5=192 mA−134 mA=58 mA.

Consequently, inside the module 10 a power loss of 0.3×6 mA×30V=54 mW arises per digital input. In a 32-channel module, a total power loss of 32×54 mW=1.73 W is thus produced. By comparison, in a 32-channel module as is currently known according to the prior art, a total power loss of 5.76 W occurs.

Figure 3:
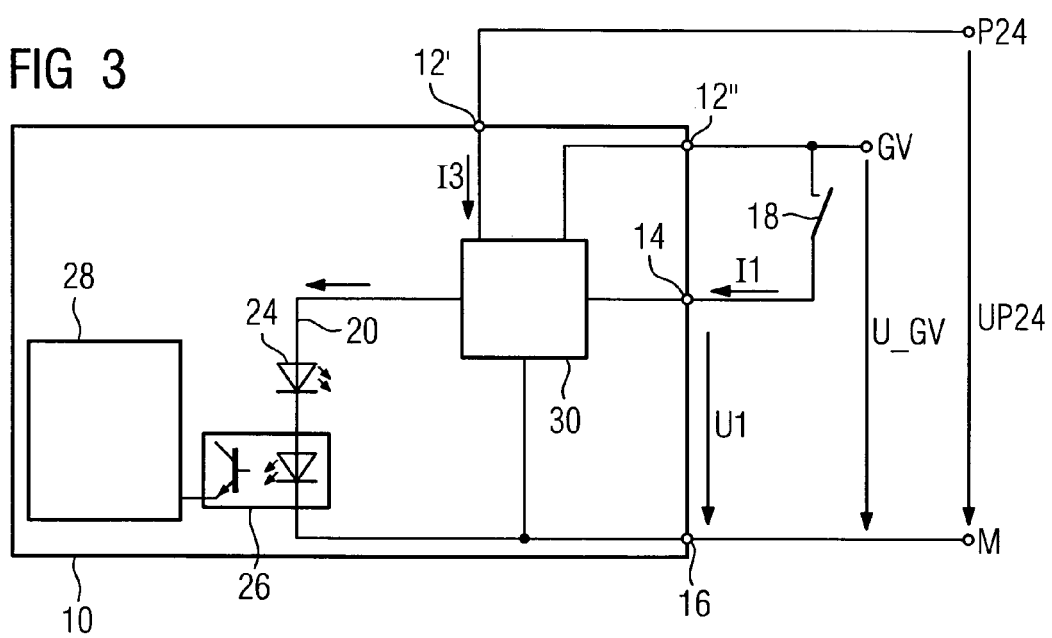
FIG. 3 shows a schematic diagram of a circuit of an input/output module comprising a digital input according to an alternative embodiment of the invention.

FIG. 3 shows an input/output module 10 according to an alternative embodiment of the invention. In contrast to the embodiment according to FIG. 2, the module 10 in the embodiment according to FIG. 3 has as a power supply contact 12 a first and a second power supply contact 12', 12". The first power supply contact 12' is provided for supplying the input/output module 10 with electrical energy. The second power supply contact 12" is provided for outputting electrical energy through the outputting means 30 and for connecting the sensor 18. To this end, an outputting of the electrical energy which has been or can be input via the signaling contact 14 is provided via the second power supply contact 12".

The module 10 is thus supplied via the module supply P24 applied at the first power supply contact 12'. By means of the outputting means 30, the module 10 generates a detector and sensor supply which is fed from two sources, namely primarily from the power, that is, the electrical energy which is fed into the module 10 via the digital inputs, i.e. via the, or each, signaling input 14, and secondarily from the voltage which applies at the first power supply contact 12', and which is labeled GV in FIG. 3. From the voltage applied to the first power supply contact 12', however, only that proportion is demanded which is needed in order to cover its intrinsic consumption due to unavoidable losses by the circuit, in particular the outputting means 30, with an efficiency of necessarily less than 100%. A switch is connected as a sensor 18 to the digital input, i.e. to the signaling contact 14 of the module 10. In the closed position, this switch applies the potential GV to the digital input. The input current I1 consequently flows into the module, when a voltage U1 is applied over the signaling contact 14 and the grounding contact 16. At the digital input, the module 10 receives a current of I1=6 mA. As an outputting means 30, the switching regulator regulates the current I1 such that it is held constant at 6 mA. When a voltage of U1=30V is applied, the module 10 receives the power $P_{auf1}=I1 \times U1=6$ mA×30V=180 mW at the digital input. This power is received for each channel. In e.g. a 32-channel module, this is then $P_{auf32}=32 \times 0.18$ W=5.76 W. The switching regulator 30 outputs this received power at least in part to the potential GV. The power output is calculated to be $P_{ab}=U_{GV} \times I1$. The emitted power Pab is generated inside the module 10 by the switching regulator 30, in particular in its embodiment as a clocked step-up converter, from the received power $P_{auf32}$. If this generation is effected with an efficiency of e.g. 70%, only 0.3×5.76 W 1.7 W still accrues in the module 10 as a power loss. Only a current I3, which is needed to cover the losses, is received from the power supply P24.

Figure 4:
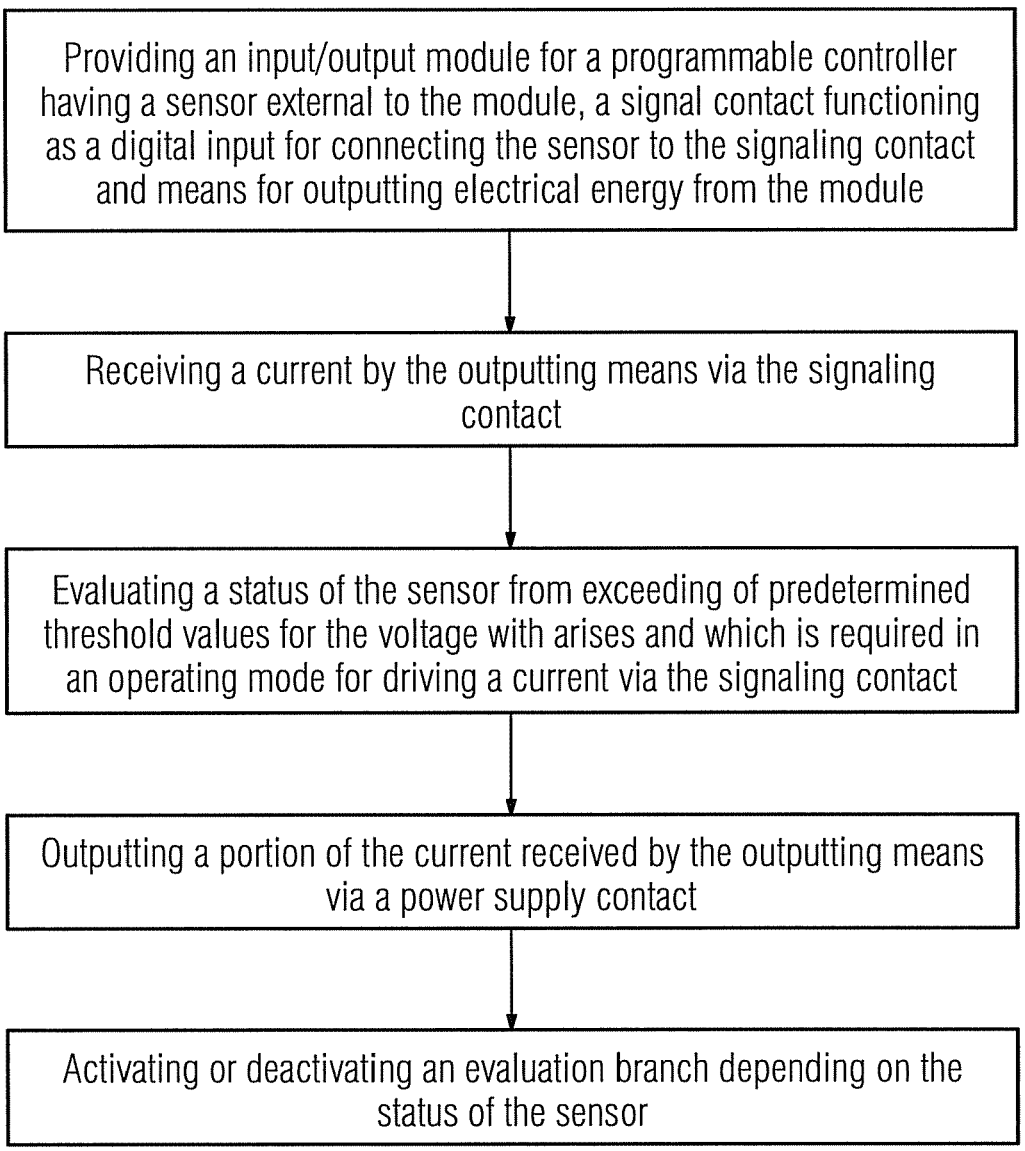
FIG. 4 shows a flowchart of a method for operating an input/output module.

FIG. 4 shows a flowchart of a method for operating an input/output module. According to this method, it is provided that the outputting means receive/s a current via the signaling contact, that the evaluation of the status of a sensor connected to the signaling contact, i.e. the input contact of the respective digital input, is effected from a voltage which is required in operating mode for driving a current via the signaling contact, in particular from the exceeding of predetermined or predeterminable threshold values for the voltage level arising, and that at least some of the current received by the outputting means is output again via the power supply contact.

It is preferably also provided that, in order to transfer the recognized status of the connected sensor to a processing unit, an evaluation branch which comprises in particular an optocoupler, in particular an optocoupler and a display element, is activated or deactivated depending on said status.

The invention can thus be summarized as follows:

Whenever a digital input receives power, a power loss occurs inside the module 10. However, instead of this power loss being converted into heat, it is provided according to the invention that the module 10 (or, insofar as the individual input channel is affected, the respective input channel) generates an output voltage and/or an output current, i.e. electrical energy, from the input power and thus functions in practice as a power supply which re-emits (outputs) at least some of the power input so that an occurrence of dissipation heat internally within the module is prevented or reduced.

The invention claimed is:

1. An input/output module for a programmable controller comprising:
    a sensor external to the module, comprising:
        a signaling contact functioning as a digital input for connecting the sensor at least to the signaling contact; and
        means for outputting electrical energy from the module, the electrical energy being input via the signaling contact,
    wherein the outputting means comprises processing functionality for recognizing a status of the sensor connected to the signaling contact from a voltage which is required in operating mode for driving a current via the signaling contact, the status being recognized from exceeding predetermined threshold values for the voltage, and
    wherein the recognized status of the sensor is transferred to a processing unit by an evaluation branch, the evaluation branch being configured to be triggered by the status of the sensor determined by the processing functionality.

2. The input/output module according to claim 1, further comprising a power supply contact for connecting the sensor in addition to the signaling contact.

3. The input/output module according to claim 1, wherein the outputting means comprises a switching regulator.

4. The input/output module according to claim 3, wherein the outputting means comprises a switching regulator having a clocked step-up converter with a constant-current sink.

5. The input/output module according to claim 1, wherein the evaluation branch comprises an optocoupler.

6. The input/output module according to claim 5, wherein the evaluation branch comprises a display element.

7. The input/output module according to claim 2, wherein the supply contact comprises a first and a second power supply contact;
    wherein the first power supply contact has means for supplying the input/output module with electrical energy;
    wherein the second power supply contact has means for outputting electrical energy through the outputting means and for connecting the sensor; and
    wherein the module is configured for electrical energy input via the signaling contact being output via the second power supply contact.

8. The input/output module as claimed in claim 7, wherein the outputting means further comprises, means for removing the electrical energy which can be output via the second power supply contact from a current which can be input via the signaling contact and from an electrical current which can be input via the first power supply contact.

9. A method for operating an input/output module for a programmable controller having a sensor external to the module, a signaling contact configured to function as a digital input for connecting the sensor to the signaling contact and means for outputting electrical energy from the module, the method comprising:
    receiving a current by outputting means via the signaling contact;

evaluating a status of the sensor from exceeding of predetermined threshold values for a voltage which arises, and which is required in an operating mode for driving a current via the signaling contact, the outputting means comprising processing functionality for the evaluating the status of the sensor;

transferring the evaluated status of the sensor to a processing unit by an evaluation branch, the evaluation branch being configured to be triggered by the status of the sensor determined by the processing functionality; and outputting a portion of the current received by the outputting means via a power supply contact.

10. The method according to claim 9, further comprising: activating an evaluation branch depending on the sensor status.

11. The method according to claim 9, further comprising: deactivating an evaluation branch depending on the sensor status.

12. The method according to claim 10, wherein the activating an evaluation branch step comprises activating an optocoupler and a display element.

* * * * *